United States Patent [19]

Tojima

[11] Patent Number: 4,996,524
[45] Date of Patent: Feb. 26, 1991

[54] ADDRESS INFORMATION REGISTERING/SEARCHING SYSTEM IN NETWORK SYSTEM

[75] Inventor: Akihiko Tojima, Tachikawa, Japan

[73] Assignee: Kabushiki Kaisha Toshiba, Kawasaki, Japan

[21] Appl. No.: 373,054

[22] Filed: Jun. 28, 1989

[30] Foreign Application Priority Data

Jun. 30, 1988 [JP] Japan .................. 63-160816

[51] Int. Cl.⁵ .............................................. H04B 1/00
[52] U.S. Cl. .......................... 340/825.02; 340/825.52; 370/60; 370/85.13; 370/94.1
[58] Field of Search ...................... 340/825.02, 825.03, 340/825.07, 825.08, 825.22, 825.5, 825.52; 370/60, 85.13, 85.14, 94.1; 364/900 MS File

[56] References Cited

U.S. PATENT DOCUMENTS 4,597,078 6/1986 Kempf .............................. 370/85.13
4,740,954 4/1988 Cotton et al. ................. 340/825.02
4,864,563 9/1989 Pavey et al. ........................ 370/94.1

Primary Examiner—Donald J. Yusko
Assistant Examiner—D. Magistre
Attorney, Agent, or Firm—Finnegan, Henderson, Farabow, Garrett and Dunner

[57] ABSTRACT

An address information searching system includes a high frequency address table, a low frequency address table, and a searching unit. Each of the high and low address tables stores address information including a node address, a branch address, and time data representing an elapsed time from a timing at which the addresses are registered or referred to. In order to transmit data to a trunk network or an intra-branch-network, the high frequency address table is first referred to search for object address information. When the object address information is not registered in the high frequency address table, the low frequency address table is referred to search the address information. It is determined that the object address information is registered in the high or low frequency address tables as a result of searching performed, time data of the object address information is reset the high and low frequency address tables are accessed at a substantially predetermined period, and the time data of each address information is incremented.

20 Claims, 10 Drawing Sheets

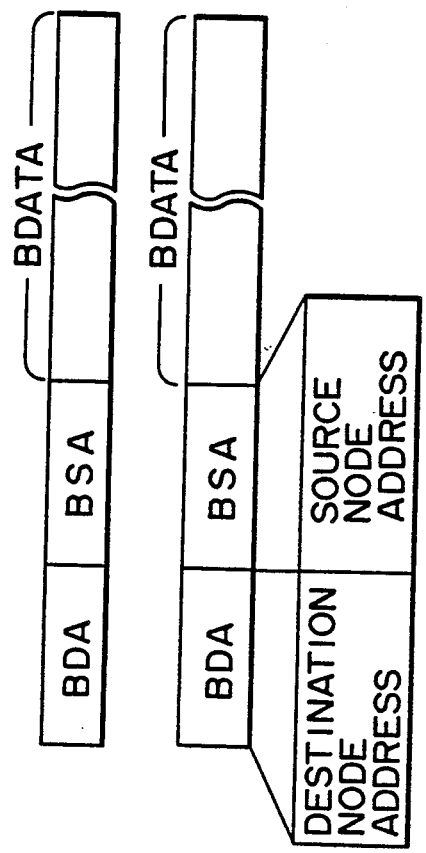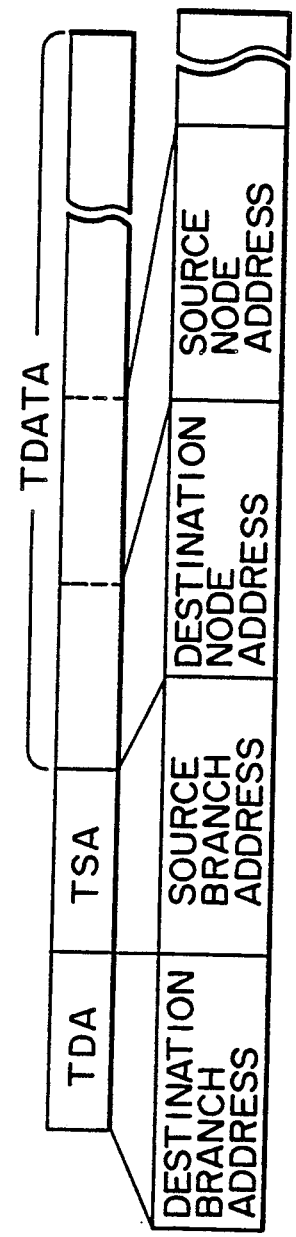
F I G. 1A (PRIOR ART)
F I G. 1B (PRIOR ART)
F I G. 1C (PRIOR ART)

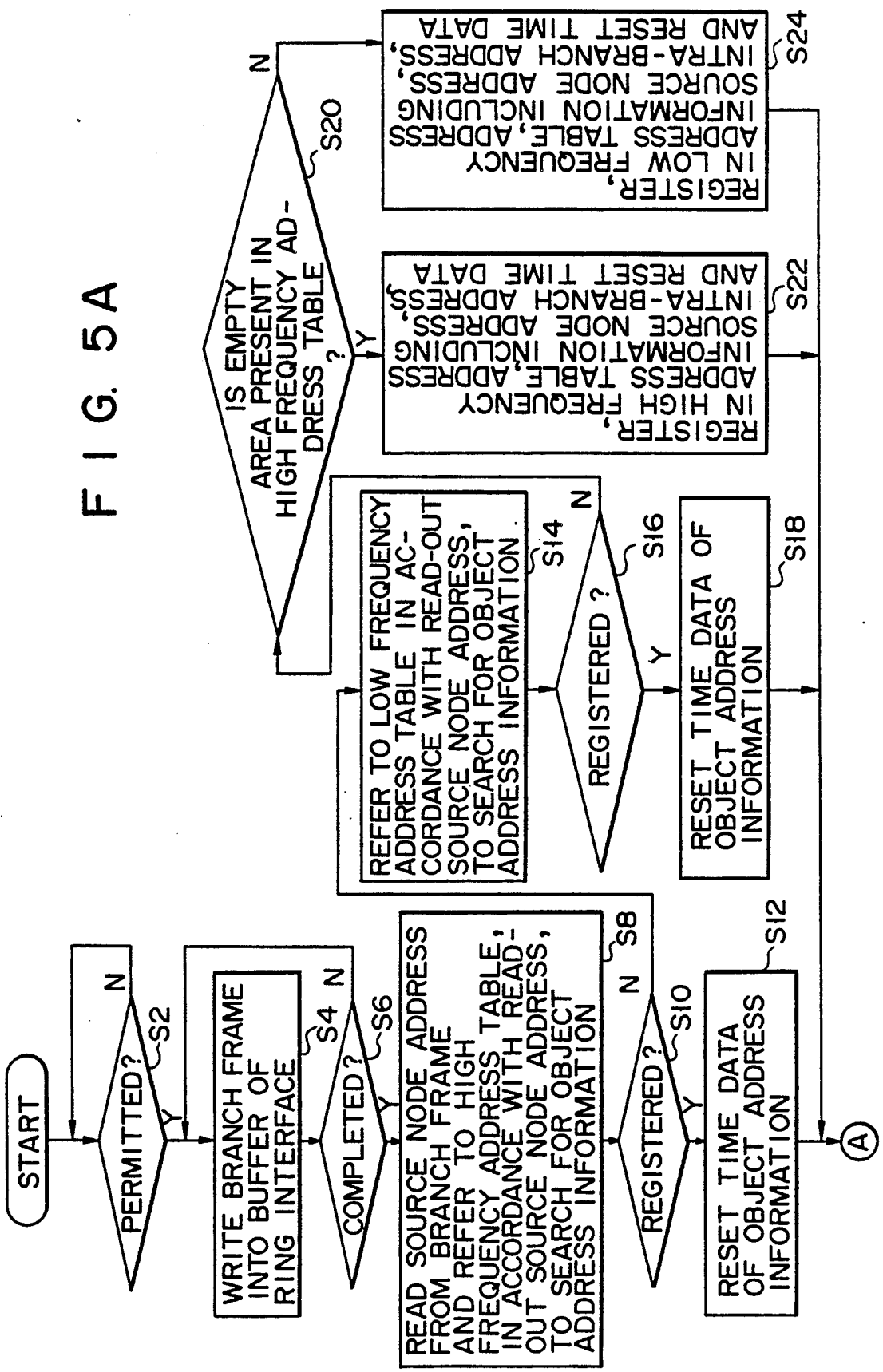

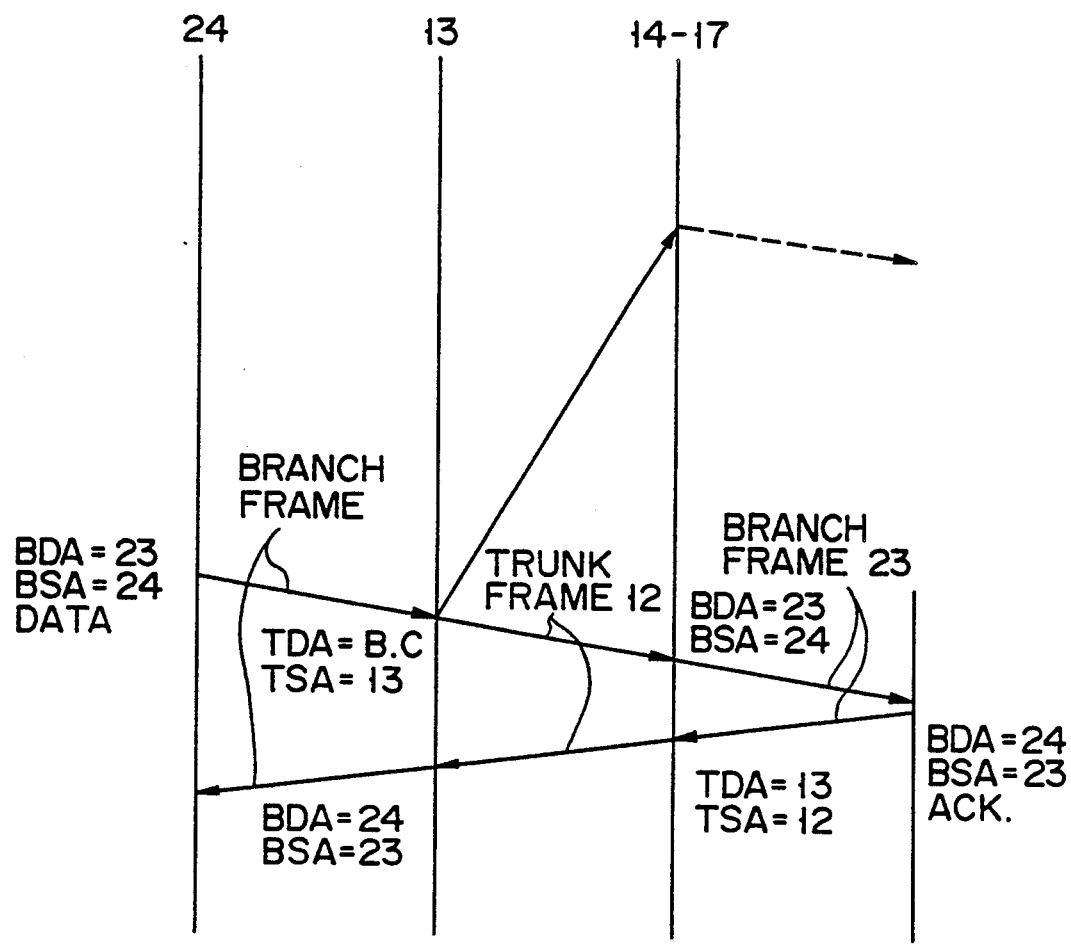
F I G. 8

ADDRESS INFORMATION REGISTERING/SEARCHING SYSTEM IN NETWORK SYSTEM

BACKGROUND OF THE INVENTION

1. Field of the Invention

The present invention relates to an address information registering/searching system in a network system in which a plurality of stations are connected to a trunk network, each station includes a network adaptor, and nodes are connected to some of the stations via branch networks and, more particularly, to an address information registering/searching system suitable for address information searching required for data transfer between nodes, and between a node and a station.

2. Description of the Related Art

As shown in FIG. 1A, a branch frame used in data transfer in a branch network includes a branch destination node address field BDA, a branch source node address field BSA, and a branch data field BDATA. In a network system in which branch networks are connected to a trunk network via network adaptors of stations, when data is to be transmitted from a source node in a certain branch network to a destination node in another branch network, a destination node address, a source node address, and data to be transmitted are written in the fields BDA, BSA, and BDATA, respectively, of the branch frame, as shown in FIG. 1B. Such a branch frame is transmitted from the source node to a source branch network to which the source node is connected. A source network adaptor normally monitors the branch frame on the source branch network. When the source network adaptor receives the branch frame, it cancels the branch frame if a destination address designated by a destination node address in the branch frame belongs to intra-branch-network. If the destination node does not belong to the intra-branch-network of the source network adaptor, the source network adaptor forms and transmits a trunk frame onto a trunk network. As shown in FIG. 1C, a destination branch address, a source branch address, and the branch frame shown in FIG. 1B are written in a trunk destination branch address field TDA, a trunk source branch address field TSA, and a trunk data field TDATA, respectively, of the trunk frame.

The trunk frame on the trunk network is received by a destination network adaptor at a station to which a branch network designated by the destination branch address written in the field TDA is connected. When the destination network adaptor receives the trunk frame on the trunk network, it transmits a portion of the field TDATA onto its own branch network. The branch frame on the destination network is received by a node designated by the destination node address written in the field BDA.

In this manner, the branch frame is transmitted from the node connected to the branch network in a certain station to the node connected to the branch network in another station. In this transmission, the source network adaptor must know a branch address of the branch network to which the destination node designated by the destination branch node address written in the field BDA belongs. A conventional network adaptor has an address table which registers address information by a hash system. The address information includes a pair of a node address for designating a node and a branch address of a branch network to which the node belongs.

In transmission using the trunk network, the source network adaptor searches for the address table and obtains the destination branch address of the branch network to which the destination node belongs in accordance with the destination address. In this case, if a large number of address information having the same hash value are linked by a pointer or the like, it takes a long time period to find out address information including an object address pair.

SUMMARY OF THE INVENTION

The present invention has been made in consideration of the above situation and has as its object to provide an address information registering/searching system capable of searching for address information at high speed in a network system.

In a network system to which the address information registering/searching system is applied, a plurality of stations are connected to a trunk network, at least one branch network is connected to each station, and at least one node is connected to each branch network. A node address is assigned to each node, and a branch address is assigned to each branch network. First and second node addresses are assigned to the first and second nodes, and first and second branch addresses are assigned to the first and second branch networks. In order to achieve the above object of the present invention, the address information registering/searching system suitable for transmitting data between the first node connected to the first branch network at the first station and the second node connected to the second branch network at the second station comprises:

first and second address table means each for storing a plurality of pieces of address information, each address information including a node address assigned to a certain node, a branch address assigned to a branch network to which the node is connected, and frequency data representing a search frequency of the address information;

reading means for receiving a branch frame transmitted from the first node onto the first branch network, the branch frame including a first node address assigned to the first node as a source node address, a second node address assigned to the second node as a destination node address, and data, reading out the source node address from the branch frame and generating a first search command, and reading out the destination node address from the branch frame and generating a second search command;

searching means for referring to the first address table means and selectively referring to the second address table means to search for first object address information in response to the first search command, the first object address information including the first node address and the first branch address, and referring to the first address table means and selectively referring to the second address table means to search for second object address information in response to the second search command, the second object address information including the second node address and the second branch address; and trunk transmitting means for generating a trunk frame including the first branch address written in the first object address information as a source branch address, the second branch address written in the second object address information as a destination branch address, and the branch frame and transmitting the generated trunk frame onto the trunk network.

In order to achieve the above object of the present invention, a method of transmitting data between the first node connected to the first branch network at the first station and the second node connected to the second branch network at the second station in the above network system, comprises:

receiving a branch frame transmitted from the first node onto the first branch network, the branch frame including a first node address as a source node address, a second node address as a destination node address, and data;

receiving a trunk frame on the trunk network, the trunk frame including a first branch address written in first object address information as a source branch address, a second branch address written in second object address information as a destination branch address, and the branch frame, the first object address including the first node address and the first branch address, and the second object address information including the second node address and the second branch address;

referring to a first address table and selectively referring to a second address table to search for the first and second object address information concerning the source node address and the destination node address in accordance with the source node address and the destination node address written in one of the branch and trunk frames, each of the first and second address tables storing a plurality of pieces of address information, each address information including a node address assigned to a certain node, a branch address assigned to a branch network to which the node is connected, and frequency data representing a search frequency of the address information;

generating and transmitting a trunk frame onto the trunk network in accordance with the first and second object address information and the branch frame, the trunk frame including the first branch address written in the first object address information as the source branch address, the second branch address written in the second object address information as the destination branch address, and the branch frame; and extracting the branch frame from the trunk frame and transmitting the extracted branch frame onto the first branch network.

As described above, according to the present invention, the reference frequency of address information registered in the high frequency address table which is initially searched is higher than that of address information registered in the second memory means (in the embodiment, an address table 35 which is searched when no object address information is present in the first memory means. Therefore, address information can be searched at high speed with high probability.

BRIEF DESCRIPTION OF THE DRAWINGS

FIG. 1A is a view showing a format of a branch frame used in transmission in a conventional branch network;

FIG. 1B is a view showing the branch frame;

FIG. 1C is a view showing a format of a trunk frame used in transmission in a trunk network;

FIGS. 5A and 5B are flow charts for explaining a transmission operation;

FIG. 8 is a view showing a sequence for explaining data transmission.

DETAILED DESCRIPTION OF THE PREFERRED IMPLEMENTATION

An implementation of an address information registering/searching system according to the present invention will be described in detail below with reference to the accompanying drawings.

Figure 2:
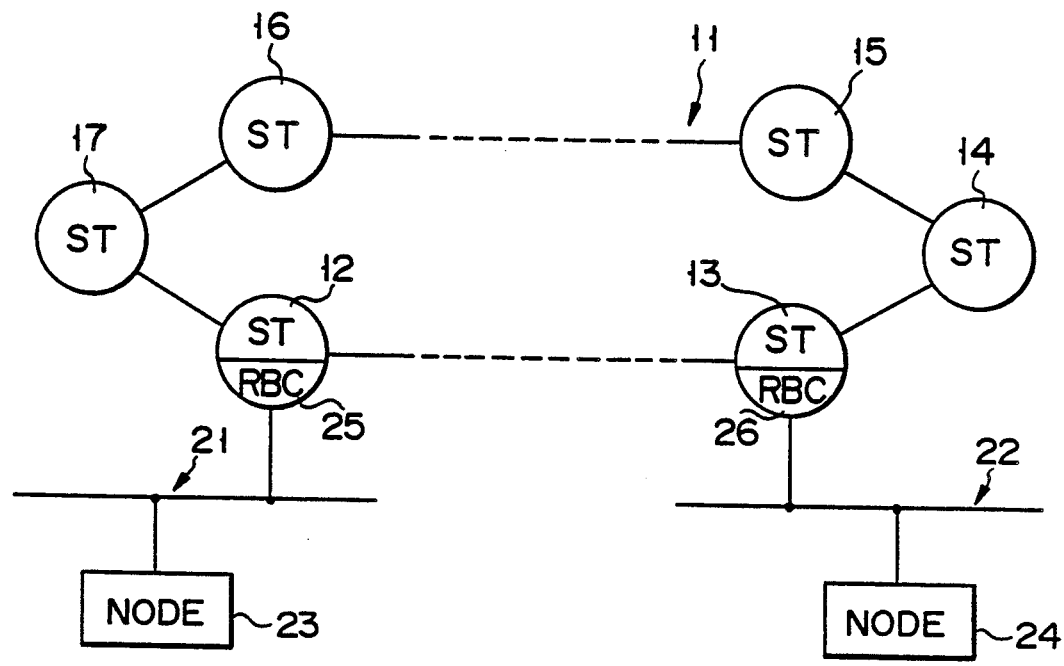
FIG. 2 is a view showing a network system to which an address information registering/searching system according to the present invention is applied.

An arrangement of the implementation of the present invention will be described below with reference to FIGS. 2 and 3. FIG. 2 shows a network system to which the address information registering/searching system according to the present invention is applied. Referring to FIG. 2, stations (STs) 12 to 17 are mutually connected by a ring network 11 as a trunk network. Bus networks 21 and 22 as branch networks are connected to the ring network 11 via network adaptors 25 and 26 called ring bus controllers (RBCs) provided at the stations 12 and 13, respectively. Nodes 23 and 24 are connected to the bus networks 21 and 22, respectively. Note that branch networks connected to the stations 14 to 17 are omitted in FIG. 2. In addition, the number of network adaptors is not limited to one for each station.

Figure 4:
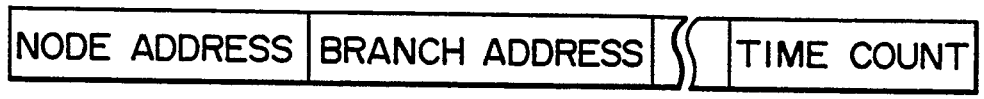
FIG. 4 is a view showing a format of address information.
Figure 3:
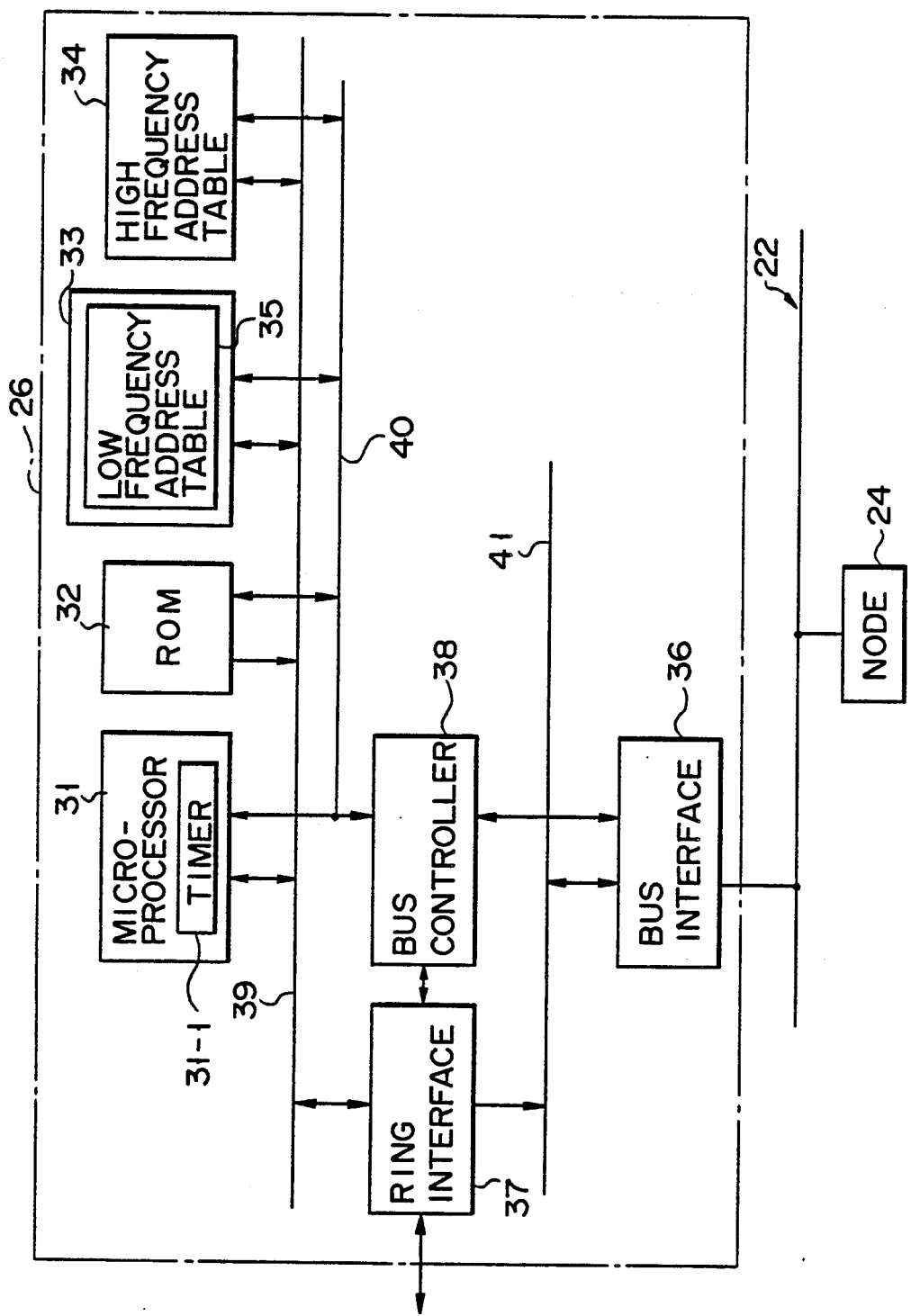
FIG. 3 is a block diagram showing a network adaptor in a station adopting the address information registering/searching system according to the preferred implementation of the present invention.

FIG. 3 shows an arrangement of the network adaptor 26 at the station 13. Referring to FIG. 3, a microprocessor 31 has an internal timer 31-1 and controls the overall network adaptor 26. The timer 31-1 generates interruption for updating address information at a predetermined time period. A ROM 32 stores microprograms for defining an operation of the microprocessor 31. A data buffer 33 stores data utilized by the microprocessor 31. The data buffer 33 has a low frequency address table 35. The microprocessor 31, the ROM 32, the data buffer 33, and a high frequency address table 34 are connected to internal buses 39 and 40. Address information is registered in the high frequency address table 34 by, e.g., a hash system. Similarly, address information is registered in the low frequency address table 35 having a larger capacity than that of the high frequency address table 34 by the hash system. Address information concerning a node having a high use frequency is registered in the high frequency address table 34, and address information concerning a node having a low use frequency is registered in the low frequency address table 35. As shown in FIG. 4, the address information includes a node address, a branch address, and time data representing an elapsed time from a timing at which the addresses are newly registered or previously referred. Note that the address information can be sorted in an order from the one having a smallest time data and then registered in the high frequency address table 34 without using the hash system. When this system is to be adopted, sorting is preferably performed in, e.g., an empty time of the microprocessor 31.

A bus network interface (to be referred to as simply a bus interface hereinafter) 36 connected to the internal bus 41 interfaces with the branch network (bus network) 22. A ring network interface (to be referred to as simply a ring interface hereinafter) 37 connected to the internal buses 39 and 41 interfaces with the trunk network (ring network) 11. The ring interface 37 incorporates a reception buffer for temporarily storing a trunk frame from the trunk network 11, a transmission buffer for temporarily storing a branch frame supplied via the bus interface 36, and an activating circuit (none of which are shown) for activating transmission to the trunk and branch networks 11 and 22. A bus controller 38 is connected to the bus interface 36, the ring interface 37 and the internal bus 40. The controller 38 controls the internal buses 39 and 41 and exchanges a control signal between the microprocessor 31 and the bus or ring interface 36 or 37.

A data transmission operation performed in the network system to which the address information registering/searching system of the present invention is applied will be described below with reference to FIG. 8. Assume that data is to be transmitted from the node 24 to the node 23. In order to transmit data from the node 24 to the node 23, a branch frame in which 23 and 24 are written in the fields BDA and BSA, respectively, is transmitted from the node 24 to the station 13. The adaptor 26 at the station 13 searches for the tables 34 and 35 to check whether transmission to the node 23 is performed for the first time. If the transmission is a first one, a broadcast address is written in the field TDA. If the transmission is not a first one, an address assigned to the branch network 21 is written in the field TDA. Thereafter, a trunk frame is formed and transmitted onto the trunk network. The trunk frame including the broadcast address is received by the stations 12 and 14 to 17. At this time, a source branch address and a source node address are stored in the high or low frequency address table at each station. In addition, time data of address information including a destination node address and a destination branch address is reset. Thereafter, the branch frame in the trunk frame is transferred onto the branch network 21. When the node 23 is to return an acknowledge to the node 24, the above operation is reversely executed. Note that in this case, since an address of the node 24 and a branch address representing the branch network 22 are already registered in the table 34 or 35, no broadcast address is used.

Figure 5B:
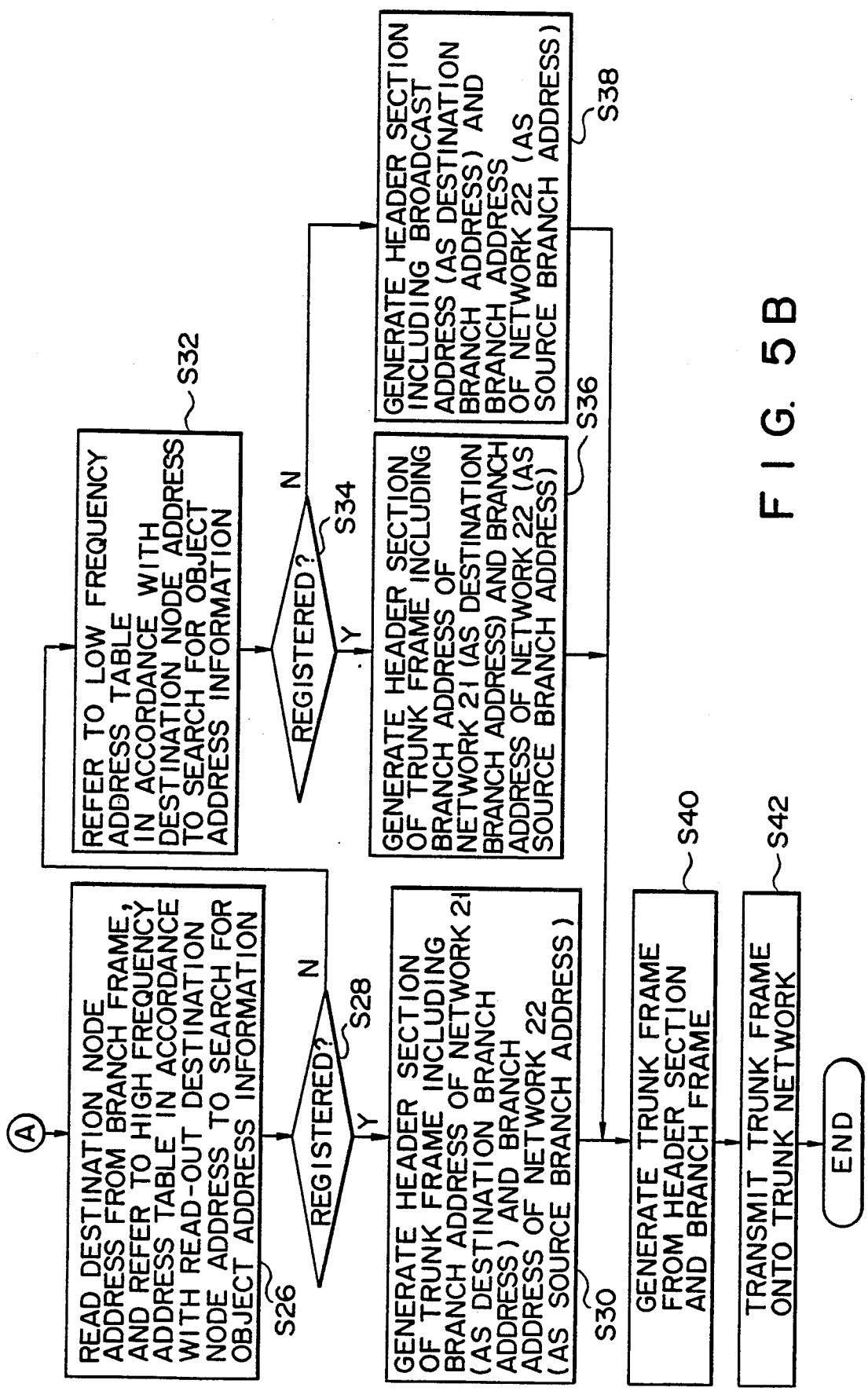

Of the above data transmission operation, an operation of converting the branch frame from the source node into the trunk frame and transmitting the converted frame onto the trunk network 11 will be described in detail below with reference to the FIGS. 5A and 5B.

Assume that the branch frame of the format shown in FIG. 1B is transmitted from the node 24 onto the branch network 22 in order to transmit data. In step S2, the branch frame on the branch network 22 is received by the bus interface 36. When the bus interface 36 starts receiving the branch frame, it outputs a request signal for requesting the use of the ring interface 37 to the bus controller 38. In response to this request signal, the bus controller 38 supplies permission in accordance with an operation state of the ring interface 37. In steps S4 and S6, in response to the permission, the bus interface 36 writes the branch frame in the transmission buffer (not shown) in the ring interface 37 via the internal bus 41 under the control of the bus controller 38. When the writing operation is completed, the bus controller 38 outputs a completion signal to the microprocessor 31.

When the microprocessor 31 receives the completion signal from the bus controller 38, in step S8, it reads out the source node address written in the field BSA of the branch frame stored in the transmission buffer of the ring interface 37. In accordance with the read-out source node address, the microprocessor 31 refers to the table 34 and checks whether address information including the source node address is registered in the high frequency address table 34. If the microprocessor 31 determines in step S10 that the object address information including the source node address is registered in the table 34, it resets time data in the object address information in step S12. Thereafter, step S26 is executed.

If the microprocessor 31 determines in step S10 that the object address information is not registered in the table 34, in step S14, it refers to the low frequency address table 35 in accordance with a source node address read out. If the microprocessor 31 determines in step S16 that the object address information is registered in the table 35, it resets the time data in the object address information in step S18. Thereafter, step S26 is executed. If the microprocessor 31 determines in step S16 that the object address information is not registered in the table 35, it checks in step S20 whether an empty area is present in the high frequency address table 34. If the microprocessor 31 determines in step S20 that the empty area is present in the table 34, in step S22, address information including a source node address, a branch address representing the branch network 22, and time data of "0" is newly registered in the table 34. Thereafter, step S26 is executed. If the microprocessor 31 determines in step S20 that no empty area is present in the table 34, the address information including time data of "0" is newly registered in the table 35. Thereafter, step S26 is executed.

When the above operation is completed, in step S26, the microprocessor 31 reads out the destination node address written in the field BDA of the branch frame stored in the transmission buffer of the ring interface 37. In accordance with the read-out destination node address, in step S28, the microprocessor 31 refers to the high frequency address table 34 and checks whether the destination node object address information is registered in the table 34. If the microprocessor 31 determines in step S28 that the object address information is registered in the table 34, step S30 is executed. In step S30, the microprocessor 31 generates a header section including the branch address, assigned to the branch network 21 to which the destination node 23 belongs, as a destination branch address and the branch address, assigned to the branch network 22, as a source branch address. In addition, the time data of the object address information is reset to "0". Thereafter, step S40 is executed.

If the microprocessor 31 determines in step S28 that the object address information including the destination node address is not registered in the high frequency address table 34, step S32 is executed. In step S32, in accordance with the read-out destination node address, the microprocessor 31 refers to the low frequency address table 35. If the microprocessor 31 determines in step S34 that the address information is registered in table 35, step S36 is executed. In step S36, si S30, the microprocessor 31 generate including the branch address network 21 to which the d a destination branch addr assigned to the branch network 22, as a source branch address. In addition, the time data in the object address information is reset. Thereafter, step S40 is executed.

If the microprocessor 31 determines in step S34 that the destination object address information is not registered in the low frequency address table 35, step S38 is executed. In step S38, in order to perform broadcast transmission, the microprocessor 31 generates a header section including a broadcast address as a destination branch address and the branch address, assigned to the branch network 22, as a source branch address. In this case, the object address information is not written in either of the tables 34 or 35. Thereafter, step S40 is executed.

After the microprocessor 31 generates the header section, in step S40, it generates a trunk frame including the header section as the fields TDA and TSA and the branch frame, stored in the reception buffer of the ring interface 37, as the field TDATA. Thereafter, the microprocessor 31 outputs a request to the ring interface 37 requesting transmission to the trunk network 11. As a result, in step S42, the trunk frame is transmitted from the ring interface 37 onto the trunk network 11.

Figure 6A:
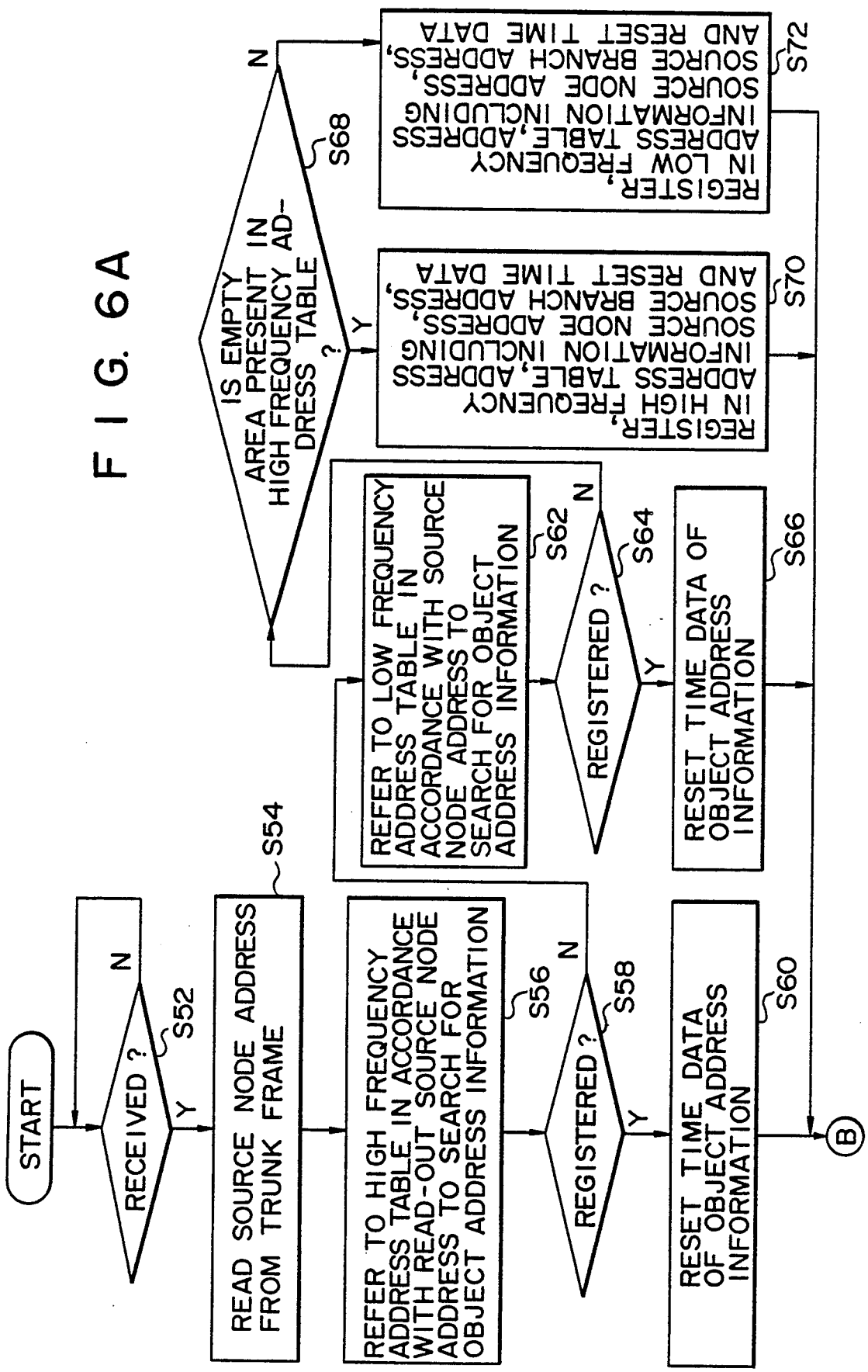
FIGS. 6A and 6B are flow charts for explaining a reception operation.
Figure 6B:
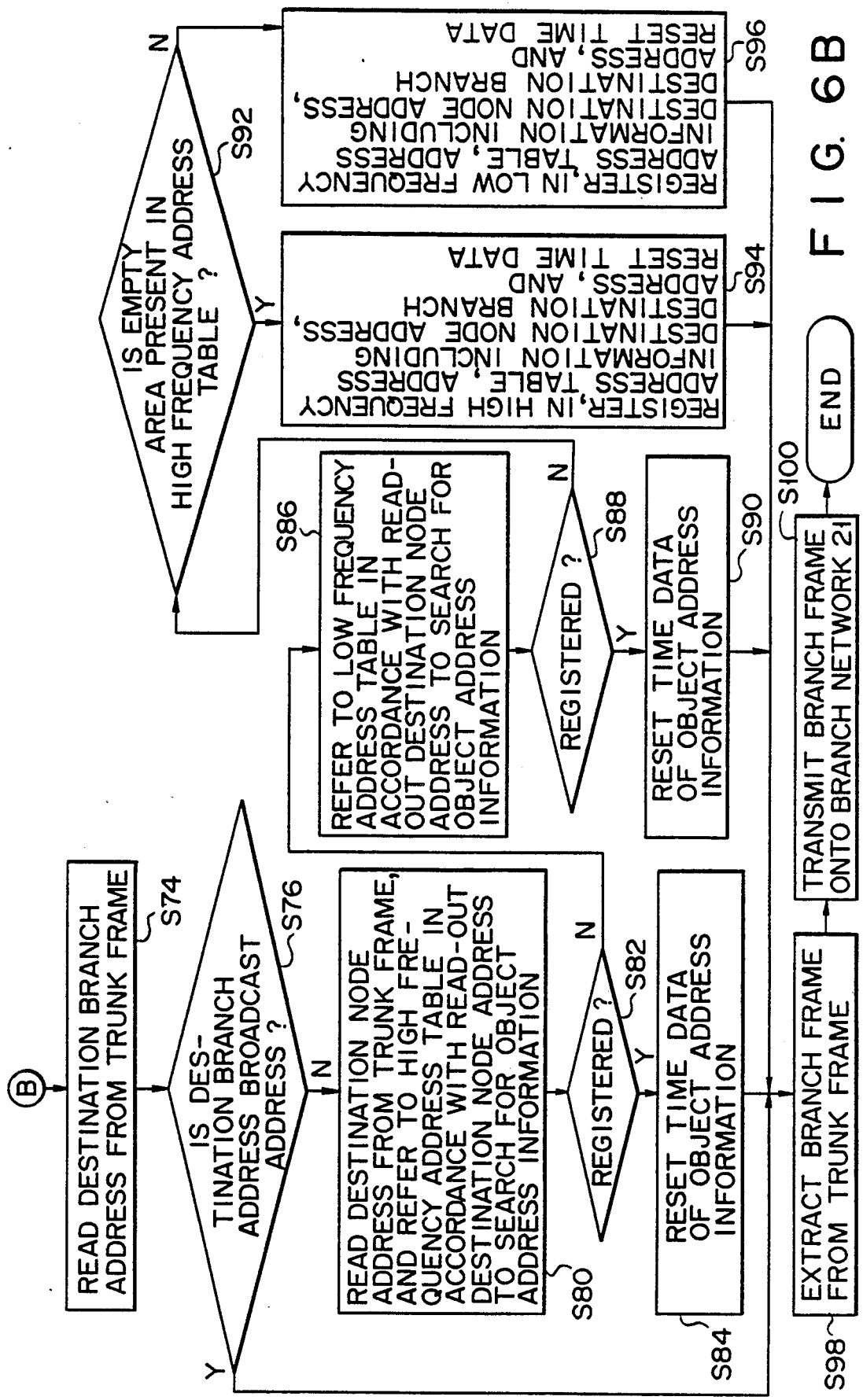

An operation in which the network adaptor 25 at the station 12 receives the trunk frame from the trunk network 11 and transmits the branch frame to the branch network 21 will be described in detail below with reference to FIGS. 6A and 6B. When the destination branch address is the broadcast address, the trunk frame is received by the ring interfaces at all the stations except for the ring interface 37 at the source station 13. It is a matter of course that the ring interface 37 at the station 13 does not receive the broadcast frame transmitted by itself or cancels the frame even if it receives the frame.

In step S52, the ring interface 37 provided at the network adaptor 26 of the station 13 monitors the trunk frame. Under the control of the bus controller 38, the ring interface 37 receives the trunk frame from the trunk network 11 and stores the received trunk frame in its internal reception buffer. When a storage operation of the received data is completed, the bus controller 38 outputs a completion signal to the microprocessor 31.

When the microprocessor 31 receives the completion signal from the bus controller 38, in step S54, it reads out source node address included in the field TDATA of the trunk frame stored in the reception data buffer of the ring interface 37. Thereafter, in step S56, the microprocessor 31 refers to the high frequency address table 34 and searches for object address information in accordance with the read-out source node address, in the same manner as when the adaptor 26 at the station 13 receives the branch frame from the branch network 22.

If the microprocessor 31 determines in step S58 that the object address information is stored in the table 34, step S60 is executed. In step S60, the microprocessor 31 resets time data in the object address information. Thereafter, step S74 is executed. If the microprocessor 31 determines in step S58 that the object address information is not stored in the table 34, step S62 is executed. In step S62, in accordance with the read-out source node address, the microprocessor 31 refers to the low frequency address table 35 and searches for the object address information. If the microprocessor 31 determines in step S64 that the object address information is stored in the table 35, step S66 is executed. In step S66, the microprocessor 31 resets the time data of the object address information stored in the table 35. Thereafter, step S74 is executed. If the microprocessor 31 determines in step S64 that the object address information is not stored in the table 35, step S68 is executed.

In step S68, the microprocessor 31 checks whether an empty area is present in the high frequency address table 34. If Y (YES) in step S68, i.e., if an empty area is present, the microprocessor 31 registers new address information including the read-out source node address, the source branch address written in the field TSA of the trunk frame, and the reset time data in the high frequency address table 34. Thereafter, step S74 is executed. If the microprocessor 31 determines in step S68 that no empty area is present, the new address information is registered in the low frequency address table 35. Thereafter, step S74 is executed.

When the above operation is completed, in step S74, the microprocessor 31 reads out the content written in the field TDA of the trunk frame and checks whether the content is a broadcast address. If the microprocessor 31 determines in step S76 that the content is the broadcast address, step S98 is executed. In step S98, the microprocessor 31 extracts the content in the field TDATA from the trunk frame and generates a branch frame.

If the microprocessor 31 determines in step S76 that the content written in the field TDA is not the broadcast address, step S80 is executed. In step S80, the destination node address included in the field TDATA of the trunk frame is read out, and processing similar to that from steps S56 to S72 is executed. That is, in accordance with the read-out destination node address, the microprocessor 31 refers to the high frequency address table 34 and searches for the object address information. If the microprocessor 31 determines in step S82 that the object address information is stored in the table 34, step S84 is executed. In step S84, the microprocessor 31 resets the time data in the object address information. Thereafter, step S98 is executed.

If the microprocessor 31 determines in step S82 that the object address information is not stored in the table 34, step S86 is executed. In step S86, in accordance with the read-out destination node address, the microprocessor 31 refers to the low frequency address table 35 and searches for the object address information. If the microprocessor 31 determines in step S88 that the object address information is stored in the table 35, step S90 is executed. In step S90, the microprocessor 31 resets the time data in the object address information. Thereafter, step S98 is executed.

If the microprocessor 31 determines in step S88 that the object address information is not stored in the table 35, step S92 is executed. In step S92, the microprocessor 31 checks whether an empty area is present in the high frequency address table 34. If the microprocessor determines in step S92 that an empty area is present in the table 34, in step S94, the microprocessor 31 registers new address information including the read-out destination node address, the destination branch address written in the field TDA of the trunk frame, and the reset time data in the table 34. If the microprocessor 31 determines in step S92 that no empty area is present, the new address information is registered in the low frequency address table 35. After step S94 or S96 is executed, step S98 is executed.

When the branch frame is generated in step S98, information indicating this is transferred from the bus controller 38 to the bus interface 36. In response to this information, the bus interface 36 extracts the branch frame from the trunk frame stored in the reception data buffer in the ring interface 37 and supplies the extracted branch frame to the branch network 21. The node 23 receives the branch frame on the branch network 21 and extracts the data therefrom. In this manner, the data is transmitted from the node 24 to the node 23.

Figure 7A:
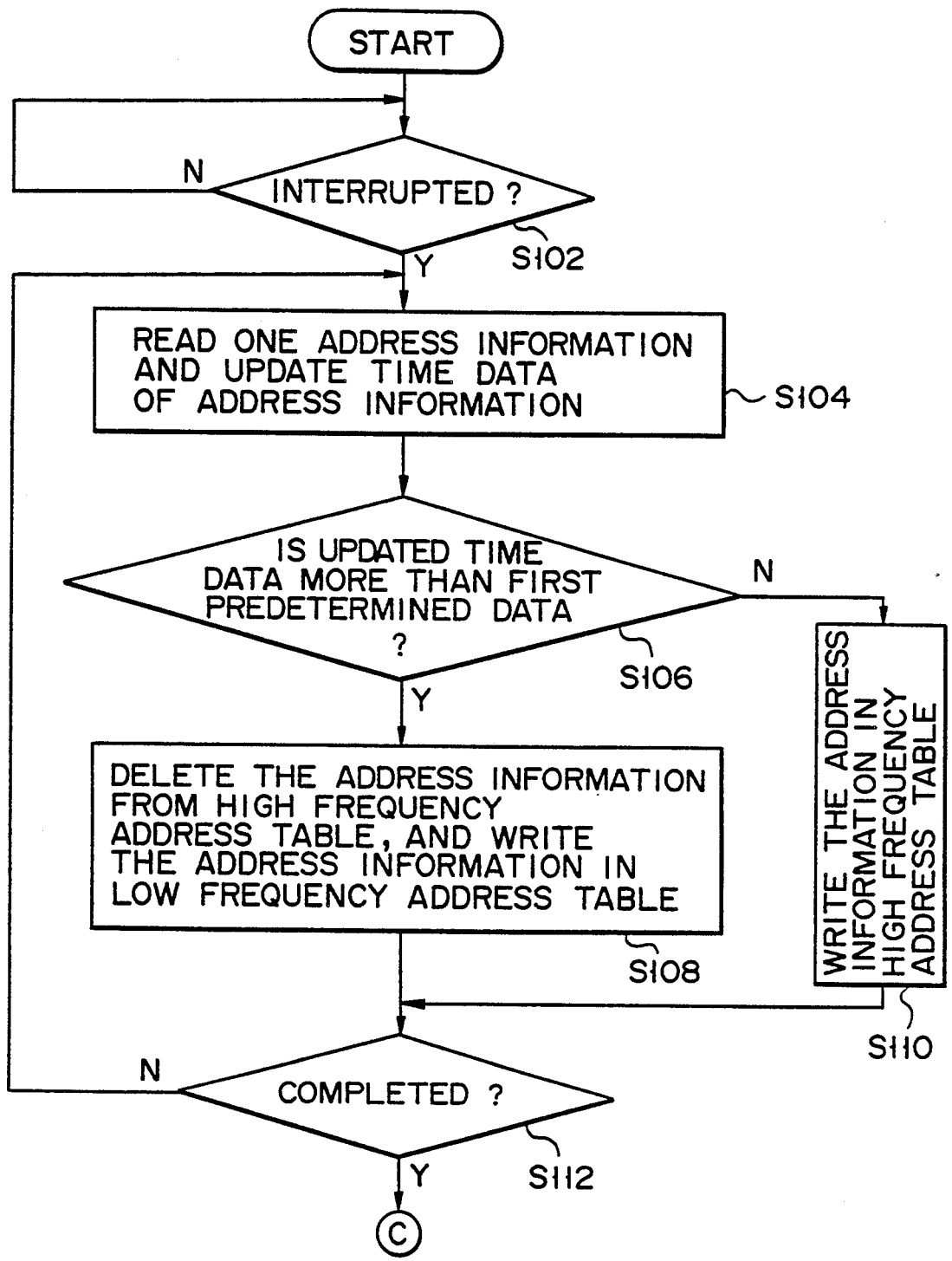
FIGS. 7A and 7B are flow charts for explaining an address information updating operation.
Figure 7B:
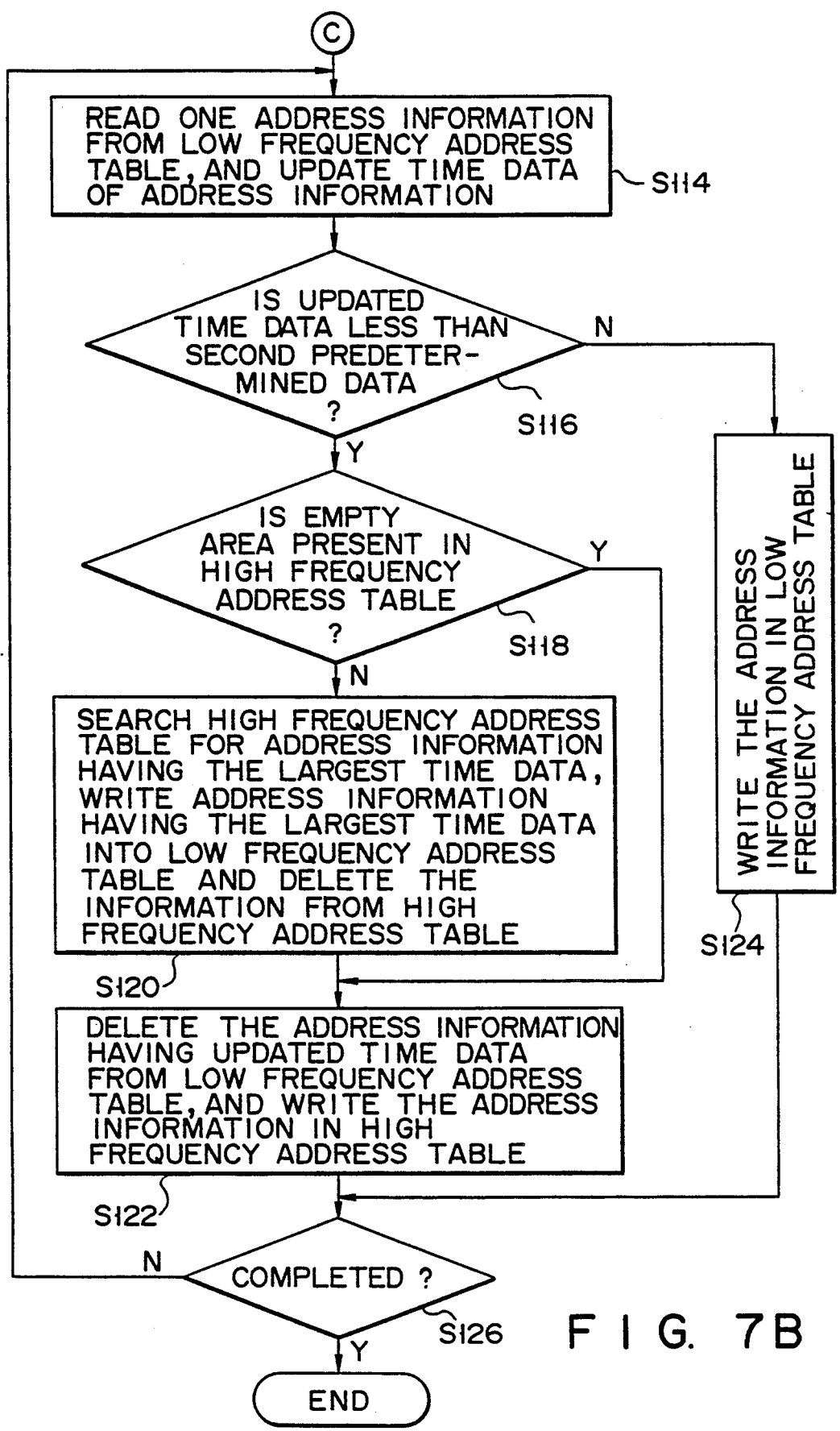

Processing for updating the address information stored in the tables 34 and 35 will be described below with reference to FIGS. 7A and 7B. The microprocessor 31 has the internal timer 31-1 and updates time data in each address information registered in the high and low frequency address tables 34 and 35 at a substantially predetermined period. That is, in step 102, interruption from the timer 31-1 is waited. The timer 31-1 generations interruption at a predetermined period.

In response to the interruption from the timer 31-1, the microprocessor 31 stops the timer 31-1. In step S104, the microprocessor 31 reads out start address information from the high frequency address table 34 and updates time data of the address information in an empty time during which no operation for data exchange is performed. Time data in address information having a node address not frequently referred in the above data exchange, i.e., a node address of a node not frequently used as a source or destination generally has a large value. In step S106, the microprocessor 31 checks whether the updated time data is more than first predetermined data. If the microprocessor 31 determines in step S106 that the updated time data is more than the first predetermined data, in step S108, it deletes the address information including the updated time data from the high frequency address table 34 and stores the address information in the low frequency address table 35. If the microprocessor 31 determines in step S106 that the updated time data is not more than the first predetermined data, in step S110, it stores the address information having the updated time data in the high frequency address table 34. Thereafter, the microprocessor 31 checks in step S112 whether the updating processing is completed for all the address information stored in the table 34. If N (NO) in step S112, step S104 is executed for the next address information. If Y in step S112, step S114 is executed.

In step S114, start address information is read out from the low frequency address table 35, and time data in the read-out address information is updated. Time data in address information having a node address of a node frequently used generally has a small value. In step S116, the microprocessor 31 checks whether the updated time data is less than second predetermined data. If the microprocessor 31 determines in step S116 that the updated time data is less than the second predetermined data, it checks in step S118 whether an empty area is present in the high frequency address table 34. If an empty area is present, step S122 is directly executed. If no empty area is present, in step S120, the microprocessor 31 refers to the high frequency address table 34 and searches for address information having the largest time data. The address information having the largest time data is transferred to the low frequency address table 35. Thereafter, in step S122, the address information having the updated time data is stored in the high frequency address table 34.

If the microprocessor 31 determines that the updated time data is more than the second predetermined data, in step S124, the address information having the updated time data is stored in the low frequency address table 35. Thereafter, the microprocessor 31 checks in step S126 whether the updating processing is completed for all the address information stored in the table 35. If N in step S126, step S114 is executed again for the next address information. If Y in step S126, the updating processing is completed, and the timer 31-1 is restarted. As a result, address information having a small timer value, i.e., having a high reference frequency is registered in the high frequency address table 34, and address information having a large timer value, i.e., having a low reference frequency is registered in the low frequency address table 35. Therefore, as described above, since the high frequency address table 34 is first referred to in order to search for address information upon data exchange, object address information can be searched for at high speed with high probability.

As has been described above, according to the address information registering/searching system of the present invention, time data in address information having a high reference frequency has a small value, and time data in address information having a low reference frequency has a large value. In the present invention, address information having small time data is stored in the high frequency address table, and address information having large time data is stored in the low frequency address table. Therefore, when searching of address information is required, in order to search for object address information, the high frequency address table is first referred. When the object address information is not stored in the high frequency address table, the low frequency address table is referred. In this manner, the object address information can be obtained at high speed with high probability. When the object address information cannot be searched from the high frequency address table, address information searching is performed for the low frequency address table. In this case, a required searching time is equivalent to that in a conventional apparatus.

Note that in the above implementation, a source node address and then a destination branch address are checked upon reception. However, whether address information concerning a destination node address is stored in the high or low frequency address table may be checked subsequently to checking of the source node address. In this case, if it is determined that the address information is not stored in either tables, the destination branch address is checked.

Furthermore, in the above implementation, communication between nodes belonging to different stations has been described. It is apparent, however, that the present invention can be similarly applied to two branch networks in a single station.

The foregoing description of the preferred implementation of the present invention has been presented for purposes of illustration and description. It is not intended to be exhaustive or to limit the invention to the precise form disclosed, and modifications and variations are possible in light of the above teachings or may be acquired from practice of the invention. The preferred implementation was chosen and described in order to explain the principles of the invention and its practical application to enable one skilled in the art to utilize the invention in various implementations and with various modifications as are suited to the particular use contemplated. It is intended that the scope of the invention be defined by the claims appended hereto and their equivalents.

What is claimed is:

1. An address information registering/searching system in a network system in which a plurality of stations are connected to a trunk network, at least one branch network is connected to each station, and at least one node is connected to each branch network, a node address being assigned to each node, and a branch address being assigned to each branch network, suitable for transmitting data between a first node connected to a first branch network of a first station and a second node connected to a second branch network of a second station, first and second node address being assigned to said first and second nodes, and first and second branch addresses being assigned to said first and second branch networks, comprising:

first and second address table means each for storing a plurality of pieces of address information, each piece of address information including a node address assigned to a certain mode, a branch address assigned to a branch network to which said node is connected, and frequency data representing a search frequency of the address information, said first address table means storing address information having a high reference frequency relative to a first predetermined reference frequency and said second address table means storing address information having a low reference frequency relative to a second predetermined reference frequency;

reading means for receiving a branch frame transmitted from said first node onto said first branch network, the branch frame including a first node address assigned to said first node as a source node address, a second node address assigned to said second node as a destination node address, and data, reading out the source node address from the branch frame and generating a first search command, and reading out the destination node address from the branch frame and generating a second search command;

searching means for referring to said first address table means and selectively referring to said second address table means to search for first object address information in response to the first search command, the first object address information including the first node address and the first branch address, and referring to said first address table means and selectively referring to said second address table means to search for second object address information in response to the second search command, the second object address information including the second node address and the second branch address; and trunk transmitting means for generating a trunk frame including the first branch address written in the first object address information as a source branch address, the second branch address written in the second object address information as a destination branch address, and the branch frame and transmitting the generated trunk frame onto said trunk network.

2. A system according to claim 1, further comprising registering means for formatting address information including the first node address, the first branch address, and first time data if it is determined that the first object address information is not registered in either said first or second address table means, formatting address information including the second node address, the second branch address, and second time data if it is determined that the second object address information is not registered in either said first or second address table means, and selectively registering the formatted address information in one of said first and second address table means.

3. A system according to claim 2, wherein said registering means includes means for checking whether an empty area is present in said first address table means, registering the formatted address information in said first address table means if it is determined that an empty area is present, and registering the formatted address information in said second address table if it is determined that no empty address is present.

4. A system according to claim 2, wherein the frequency data is time data representing a time period from a timing at which the address information is registered, the time data in the formatted address information being 0.

5. A system according to claim 1, wherein said trunk transmitting means further comprises means for writing a broadcast address as the destination branch address in the trunk frame if it is determined that the second object address information is not registered in said first and second address table means.

6. A system according to claim 1, wherein said searching means includes means for, in order to search for the first and second object address information, referring first to said first address table means, and when the object address information is not registered in said first address table means, referring to said second address table means.

7. A system according to claim 1, wherein
the frequency data is time data representing a time period from a timing at which the address information is registered or previously searched, and
said searching means further comprises reset means for resetting the time data in the first and second object address information.

8. A system according to claim 1, further comprising updating means for updating the frequency data in each address information stored in said first and second address table means, the frequency data being time data representing a time period from a timing at which the address information is registered or previously searched.

9. A system according to claim 8, wherein said updating means further comprises means for, when the updated time data in address information stored in said first address table means is more than first predetermined data, transferring the address information to said second address table means.

10. A system according to claim 8, wherein said updating means further comprises means for, when the updated time data in address information stored in said second address table means is not more than second predetermined data, checking whether an empty area is present in said first address table means, if it is determined that an empty area is present, transferring the address information to said first address table means, and if it is determined that no empty area is present, registering the address information in said second address table means.

11. A system according to claim 1, further comprising means for receiving the trunk frame transmitted onto said trunk network, extracting the branch frame from the trunk frame, and transmitting the branch frame onto said second branch network.

12. A system according to claim 11, wherein said reading means further comprises means for reading out the source node address from the trunk frame and generating the first search command, and reading out the destination node address from the trunk frame and generating the second search command, the frequency data being time data representing a time period from a timing at which the address information is registered or previously searched, and said searching means further comprises reset means for resetting the time data in the first and second object address information when the first and second object address information are searched.

13. A system according to claim 12, further comprising means for formatting address information including the first node address, the first branch address, and first time data if it is determined that the first object address information is not registered in said first and second address table means, formatting address information including the second node address, the second branch address, and second time data if it is determined that the second object address information is not registered in said first and second address table means, checking whether an empty area is present in said first address table means, registering the formatted address information in said first address table means if it is determined that an empty area is present in said first address table means, and registering the address information data in said second address table if it is determined that no empty area is present in said first address table means.

14. A method in a network system in which a plurality of stations are connected to a trunk network, at least one branch network is connected to each station, and at least one node is connected to each branch network, a node address being assigned to each node, and a branch address being assigned to each branch network, for transmitting data between a first node connected to a first branch network of a first station and a second node connected to a second branch network of a second station, first and second node addresses being assigned to said first and second nodes, and first and second branch addresses being assigned to said first and second branch networks, comprising:

receiving a branch frame transmitted from said first node onto said first branch network, the branch frame including the first node address as a source node address, the second node address as a destination node address; and data;

receiving a trunk frame on said trunk network, the trunk frame including the first branch address written in first object address information as a source branch address, the second branch address written in second object address information as a destination branch address, and the branch frame, the first object address including the first node address and the first branch address, and the second object address information including the second node address and the second branch address;

referring to, in accordance with the source node address and the destination node address written in one of the branch and trunk frames, a first address table and selectively referring to a second address table to search for the first and second object address information concerning the source node address and the destination node address, each of said first and second address tables storing a plurality of pieces of address information, each address information including a node address assigned to a certain node, a branch address assigned to a branch network to which said node is connected, and frequency data representing a search frequency of the address information, said first address table storing address information having a high reference frequency relative to a first predetermined reference frequency and said second address table storing address information having a low reference frequency relative to a second predetermined reference frequency;

generating and transmitting a trunk frame onto said trunk network in accordance with the first and second object address information and the branch frame, the trunk frame including the first branch address written in the first object address information as the source branch address, the second branch address written in the second object address information as the destination branch address, and the branch frame; and extracting the branch frames from the trunk frame; and transmitting the extracted branch frame onto said second branch network.

15. A method according to claim 14, further comprising:

formatting address information including the first node address, the first branch address, the first frequency data if it is determined that the first object address information is not registered in said first and second address tables, the frequency data being time data, and the first frequency data being 0.

formatting address information data including the second node address, the second branch address, and second frequency data if it is determined that the second object address information is not registered in said first and second address tables, the frequency data being time data, and the second frequency data being 0;

checking whether an empty area is present in said first address table, and registering the formatted address information in said first address table if it is determined that an empty area is present; and registering the formatted address information in said second address table if it is determined that no empty area is present in said first address table.

16. A method according to claim 14, further comprising resetting, when the first and second object address information are searched, frequency data of the first and second object address information, the frequency data being time data representing an elapsed time from a timing at which the object address information is registered or previously referred.

17. A method according to claim 14, further comprising reading out each address information stored in said first and second address tables at a substantially predetermined period, updating the time data of the address information, and selectively storing the address information in one of said first and second address tables in accordance with the updated time data.

18. An address information registering/searching system in a network system in which a plurality of stations are connected to a trunk network, at least one branch network is connected to each branch network, a node address being assigned to each node, and a branch address being assigned to each branch network, suitable for transmitting data between a first node connected to a first branch network at a first station and a second node connected to a second branch network at a second station, first and second node addresses being assigned to said first and second nodes, and first and second branch addresses being assigned to said first and second branch networks, comprising:

first receiving means for receiving a branch frame transmitted from said first node onto said first branch network, the branch frame including the first node address as a source node address, the second node address as a destination node address, and data;

first and second address table means each for storing a plurality of pieces of address information, each address information including a node address assigned to a certain node, a branch address assigned to a branch network to which said node is connected, and frequency data representing a search frequency of the address information, said first address table means storing address information having a high reference frequency relative to a first predetermined reference frequency and said second address table means storing address information having a low reference frequency relative to a second predetermined reference frequency;

second receiving means for receiving a trunk frame on said trunk network, the trunk frame including the first branch address written in first object address information as a source branch address, the second branch address written in second object address information as a destination branch address, and the branch frame, the first object address information including the first node address and the first branch address, and the second object address information including the second node address and the second branch address;

searching means for, in accordance with the source node address and the destination node address written in one of the branch and trunk frames, referring to said first address table means and selectively referring to said second address table means to search for the first and second object address information concerning the source and destination node addresses;

first transmitting means for generating and transmitting a trunk frame onto said trunk network in accordance with the first and second object address information and the branch frame, the trunk frame including the first branch address written in the first object address information as the source branch address, the second branch address written in the second object address information as the destination branch address, and the trunk frame; and second transmitting means for extracting the branch frame from the trunk frame and transmitting the extracted branch frame onto said second branch network.

19. A system according to claim 18, further comprising means for formatting address information including the first node address, the first branch address, and first frequency data if it is determined that the first object address information is not registered in said first and second address tables, the frequency data being time data, and the first frequency data being 0, formatting address information including the second node address, the second branch address, and second frequency data if it is determined that the second object address information is not registered in said first and second address table means, the frequency data being time data, and the second frequency data being 0, checking whether an empty area is present in said first address table means, registering the formatted address information in said first address table means if it is determined that an empty area is present, registering the formatted address information in said second address table means if it is determined that no empty area is present in said first address table means, and when the first and second object address information are searched, resetting the frequency data of the first and second object address information, the frequency data being time data representing an elapsed time from a timing at which the object address information is registered or previously referenced.

20. A system according to claim 18, further comprising means for reading out each address information stored in said first and second address table means at a substantially predetermined period, updating time data of the address information, and selectively storing the address information in one of said first and second address table mean in accordance with the updated time data.

* * * * *

UNITED STATES PATENT AND TRADEMARK OFFICE
CERTIFICATE OF CORRECTION

PATENT NO. : 4,996,524
DATED : February 26, 1991
INVENTOR(S) : Akihiko Tojima

It is certified that error appears in the above-indentified patent and that said Letters Patent is hereby corrected as shown below:

Claim 1, column 11, line 16, change "mode" to --node--.

Claim 14, column 13, line 43, after "address", delete ";".

Claim 15, column 14, line 27, after "o", delete "." and insert --;--.

Claim 20, column 16, line 43, change "mean" to --means--.

Signed and Sealed this

Fourteenth Day of December, 1993

Attest:

BRUCE LEHMAN

*Attesting Officer*    *Commissioner of Patents and Trademarks*